(12) United States Patent
Altman et al.

(10) Patent No.: US 10,986,029 B2
(45) Date of Patent: Apr. 20, 2021

(54) DEVICE, SYSTEM, AND METHOD OF DATA TRANSPORT WITH SELECTIVE UTILIZATION OF A SINGLE LINK OR MULTIPLE LINKS

(71) Applicant: LiveU Ltd., Kfar Saba (IL)

(72) Inventors: Baruch Yosef Altman, Pardes Hanna (IL); Nitsan Dolev Elfassy, Tel Mond (IL)

(73) Assignee: LIVEU LTD., Kfar Saba (IL)

( * ) Notice: Subject to any disclaimer, the term of this patent is extended or adjusted under 35 U.S.C. 154(b) by 158 days.

(21) Appl. No.: 16/446,661

(22) Filed: Jun. 20, 2019

(65) Prior Publication Data

US 2019/0312815 A1 Oct. 10, 2019

Related U.S. Application Data

(63) Continuation-in-part of application No. PCT/IL2017/051331, filed on Dec. 10, 2017, which is
(Continued)

(51) Int. Cl.
*H04L 12/851* (2013.01)
*H04L 12/26* (2006.01)
(Continued)

(52) U.S. Cl.
CPC ...... *H04L 47/2441* (2013.01); *H04L 43/0864* (2013.01); *H04L 43/18* (2013.01);
(Continued)

(58) Field of Classification Search
None
See application file for complete search history.

(56) References Cited

U.S. PATENT DOCUMENTS 5,280,470 A 1/1994 Buhrke et al.
5,574,970 A 11/1996 Lindquist et al.
(Continued)

FOREIGN PATENT DOCUMENTS

CA 2664349 C 2/2014
CN 1606857 4/2005
(Continued)

OTHER PUBLICATIONS

Raid Y. Zaghal and Javed I. Khan, "EFSM/SDL modeling of the original TCP standard (RFC793) and the Congestion Control Mechanism of TCP Reno", Jan. 2005; downloaded on Jul. 15, 2019 from: www.medianet.kent.edu/techreports/TR2005-07-22-tcp-EFSM.pdf.
(Continued)

*Primary Examiner* — Diane L Lo
(74) *Attorney, Agent, or Firm* — Eitan Mehulal Sadot

(57) ABSTRACT

Device, system, and method of data transport with selective utilization of a single link or multiple links. An apparatus includes, or is associated with, multiple transmitters. A link bonding management unit determines with regard to a data-flow that is intended for transmission to a remote recipient, whether to transmit the data-flow via a single communication link over a single transmitter of the apparatus, or conversely, to transmit the data-flow via two or more communication links serviced by two or more, respective, transmitters of the apparatus. Additionally or alternatively, the allocation of packets among transmitters that participate in a virtual bonded transmission, is modified based on one or more performance characteristics.

20 Claims, 2 Drawing Sheets

Related U.S. Application Data a continuation-in-part of application No. 15/509,339, filed as application No. PCT/IL2015/050917 on Sep. 8, 2015, now Pat. No. 10,349,462.

(60) Provisional application No. 62/689,255, filed on Jun. 25, 2018, provisional application No. 62/507,805, filed on May 18, 2017, provisional application No. 62/553,931, filed on Sep. 4, 2017, provisional application No. 62/047,252, filed on Sep. 8, 2014.

(51) Int. Cl.

| | | |
|---|---|---|
| *H04L 12/807* | (2013.01) | |
| *H04W 28/02* | (2009.01) | |
| *H04L 12/927* | (2013.01) | |
| *H04L 12/841* | (2013.01) | |
| *H04L 12/853* | (2013.01) | |

(52) U.S. Cl.
CPC ...... *H04L 47/2416* (2013.01); *H04L 47/2483* (2013.01); *H04L 47/27* (2013.01); *H04L 47/283* (2013.01); *H04L 47/805* (2013.01); *H04W 28/0236* (2013.01)

(56) References Cited

U.S. PATENT DOCUMENTS

| | | |
|---|---|---|
| 5,699,413 A | 12/1997 | Sridhar |
| 5,771,229 A | 6/1998 | Gavrilovich |
| 6,154,637 A | 11/2000 | Wright et al. |
| 6,169,896 B1 | 1/2001 | Sant et al. |
| 6,288,753 B1 | 9/2001 | DeNicola et al. |
| 6,496,477 B1 | 12/2002 | Perkins |
| 6,510,553 B1 | 1/2003 | Hazra |
| 6,647,015 B2 | 11/2003 | Malkemes et al. |
| 6,683,877 B1 | 1/2004 | Gibbs et al. |
| 6,754,872 B2 | 6/2004 | Zhang et al. |
| 6,757,256 B1 | 6/2004 | Anandakumar et al. |
| 6,785,330 B1 | 8/2004 | Whealton et al. |
| 6,788,686 B1 | 9/2004 | Khotimsky et al. |
| 6,831,574 B1 | 12/2004 | Mills et al. |
| 6,842,446 B2 | 1/2005 | Everson et al. |
| 6,904,049 B1 | 6/2005 | Maeda |
| 6,987,732 B2 | 1/2006 | Gracon et al. |
| 6,999,432 B2 | 2/2006 | Zhang et al. |
| 7,013,354 B1 | 3/2006 | Beck et al. |
| 7,027,415 B1 | 4/2006 | Dahlby et al. |
| 7,082,221 B1 | 7/2006 | Jiang |
| 7,151,762 B1 | 12/2006 | Ho et al. |
| 7,237,032 B2 | 6/2007 | Gemmell |
| 7,237,033 B2 | 6/2007 | Weigand et al. |
| 7,292,571 B2 | 11/2007 | Brown |
| 7,317,750 B2 | 1/2008 | Shattil |
| 7,324,491 B1 | 1/2008 | Benveniste |
| 7,340,764 B2 | 3/2008 | Kubota et al. |
| 7,542,456 B2 | 6/2009 | Garg et al. |
| 7,551,671 B2 | 6/2009 | Tyldesley et al. |
| 7,738,391 B2 | 6/2010 | Melpignano et al. |
| 7,894,807 B1 | 2/2011 | Drennan |
| 7,948,933 B2 | 5/2011 | Ohayon |
| 8,125,989 B2 | 2/2012 | Kissel |
| 8,165,044 B2 | 4/2012 | Mahajan et al. |
| 8,204,085 B1 | 6/2012 | Courtney et al. |
| 8,467,337 B1 | 6/2013 | Ohayon |
| 8,488,659 B2 | 7/2013 | Ohayon |
| 8,649,402 B2 | 2/2014 | Ohayon |
| 8,737,436 B2 | 5/2014 | Ohayon |
| 8,787,966 B2 | 7/2014 | Altman |
| 8,811,292 B2 | 8/2014 | Ohayon |
| 8,848,697 B2 | 9/2014 | Ohayon |
| 8,942,179 B2 | 1/2015 | Ohayon |
| 8,942,215 B2 | 1/2015 | Mallet |
| 8,964,646 B2 | 2/2015 | Ohayon |
| 8,984,576 B2 | 3/2015 | Sze |
| 9,042,444 B2 | 5/2015 | Frusina |
| 9,154,247 B2 | 10/2015 | Altman |
| 9,203,498 B2 | 12/2015 | Ohayon |
| 9,237,490 B2 | 1/2016 | Pereira |
| 9,277,176 B2 | 3/2016 | Khay-Ibbat |
| 9,338,650 B2 | 5/2016 | Stein |
| 9,357,427 B2 | 5/2016 | Sze |
| 9,369,921 B2 | 6/2016 | Altman |
| 9,379,756 B2 | 6/2016 | Altman |
| 9,538,513 B2 | 1/2017 | Ohayon |
| 9,692,913 B2 | 6/2017 | Altman |
| 9,712,267 B2 | 7/2017 | Altman |
| 9,736,079 B2 | 8/2017 | Sze |
| 9,756,468 B2 | 9/2017 | Frusina et al. |
| 10,135,743 B2 * | 11/2018 | Munoz Kirschberg ............ H04L 47/2441 |
| 2002/0040479 A1 | 4/2002 | Ehrman et al. |
| 2002/0054578 A1 | 5/2002 | Zhang et al. |
| 2002/0071393 A1 | 6/2002 | Musoll |
| 2002/0146232 A1 | 10/2002 | Harradine et al. |
| 2002/0154703 A1 | 10/2002 | Kubota et al. |
| 2002/0174434 A1 | 11/2002 | Lee et al. |
| 2002/0176482 A1 | 11/2002 | Chien |
| 2003/0002577 A1 | 1/2003 | Pinder |
| 2003/0009717 A1 | 1/2003 | Fukushima et al. |
| 2003/0016770 A1 | 1/2003 | Trans et al. |
| 2003/0046708 A1 | 3/2003 | Jutzi |
| 2003/0074554 A1 | 4/2003 | Roach et al. |
| 2003/0174733 A1 | 9/2003 | Kawai et al. |
| 2004/0013192 A1 | 1/2004 | Kennedy |
| 2004/0023652 A1 | 2/2004 | Shah et al. |
| 2004/0025186 A1 | 2/2004 | Jennings et al. |
| 2004/0088634 A1 | 5/2004 | Kim et al. |
| 2004/0098748 A1 | 5/2004 | Bo et al. |
| 2004/0133917 A1 | 7/2004 | Schilling |
| 2004/0135879 A1 | 7/2004 | Stacy et al. |
| 2004/0177155 A1 | 9/2004 | Enokida et al. |
| 2004/0180696 A1 | 9/2004 | Foore et al. |
| 2005/0034155 A1 | 2/2005 | Gordon et al. |
| 2005/0035368 A1 | 2/2005 | Bunyk |
| 2005/0041586 A1 | 2/2005 | Jiang |
| 2005/0047363 A1 | 3/2005 | Jiang |
| 2005/0066033 A1 | 3/2005 | Cheston |
| 2005/0105815 A1 | 5/2005 | Zhang et al. |
| 2005/0163093 A1 | 7/2005 | Garg et al. |
| 2005/0185621 A1 | 8/2005 | Sivakumar |
| 2005/0243835 A1 | 11/2005 | Sharma |
| 2005/0265383 A1 | 12/2005 | Melpignano et al. |
| 2006/0015637 A1 | 1/2006 | Chung |
| 2006/0015917 A1 | 1/2006 | Rozental |
| 2006/0015924 A1 | 1/2006 | Kortum et al. |
| 2006/0062242 A1 | 3/2006 | Dacosta |
| 2006/0062243 A1 | 3/2006 | Dacosta |
| 2006/0085551 A1 | 4/2006 | Xie et al. |
| 2006/0088092 A1 | 4/2006 | Chen et al. |
| 2006/0098573 A1 | 5/2006 | Beer |
| 2006/0146831 A1 | 7/2006 | Argyropoulos et al. |
| 2006/0221846 A1 | 10/2006 | Dyck et al. |
| 2006/0264184 A1 | 11/2006 | Li et al. |
| 2006/0274773 A1 | 12/2006 | Cohen et al. |
| 2007/0064811 A1 | 3/2007 | Zador et al. |
| 2007/0064949 A1 | 3/2007 | Choi et al. |
| 2007/0083899 A1 | 4/2007 | Compton et al. |
| 2007/0098007 A1 | 5/2007 | Prodan et al. |
| 2007/0121678 A1 | 5/2007 | Brooks et al. |
| 2007/0124773 A1 | 5/2007 | Morris |
| 2007/0136777 A1 | 6/2007 | Hasek et al. |
| 2007/0171928 A1 | 7/2007 | Kim et al. |
| 2007/0183452 A1 | 8/2007 | Hryszko et al. |
| 2007/0207782 A1 | 9/2007 | Tran |
| 2007/0207832 A1 | 9/2007 | Gerardi et al. |
| 2007/0230475 A1 | 10/2007 | Langner |
| 2007/0247515 A1 | 10/2007 | Roman |
| 2007/0263072 A1 | 11/2007 | Lochbaum et al. |
| 2007/0268876 A1 | 11/2007 | Yellin et al. |
| 2008/0025210 A1 | 1/2008 | Honary et al. |
| 2008/0034396 A1 | 2/2008 | Lev |
| 2008/0075031 A1 | 3/2008 | Ohayon |
| 2008/0285555 A1 | 11/2008 | Ogashara |

(56) References Cited

U.S. PATENT DOCUMENTS

| | | | |
|---|---|---|---|
| 2008/0320501 A1 | 12/2008 | Li | |
| 2010/0322259 A1 | 12/2010 | Garg et al. | |
| 2012/0039391 A1 | 2/2012 | Frusina | |
| 2013/0088961 A1 | 4/2013 | Ramachandran | |
| 2013/0142234 A1 | 6/2013 | Ohayon | |
| 2013/0155231 A1 | 6/2013 | Ohayon | |
| 2013/0227670 A1 | 8/2013 | Ahmad | |
| 2013/0301584 A1 | 11/2013 | Addepalli | |
| 2014/0040442 A1 | 2/2014 | Saavedra | |
| 2014/0064080 A1* | 3/2014 | Stevens | H04L 47/2483 370/235 |
| 2014/0112191 A1 | 4/2014 | Farkas | |
| 2014/0173018 A1* | 6/2014 | Westphal | H04L 45/123 709/213 |
| 2014/0220966 A1 | 8/2014 | Muetzel | |
| 2014/0269553 A1 | 9/2014 | Stein | |
| 2014/0355446 A1 | 12/2014 | Altman | |
| 2014/0376370 A1 | 12/2014 | Cioffi | |
| 2015/0003465 A1 | 1/2015 | Saavedra | |
| 2015/0215738 A1* | 7/2015 | Frusina | H04L 47/125 455/426.1 |
| 2015/0244580 A1 | 8/2015 | Saavedra | |
| 2015/0263991 A1 | 9/2015 | Macchiano | |
| 2017/0195208 A1 | 7/2017 | Kissel | |

FOREIGN PATENT DOCUMENTS

| | | |
|---|---|---|
| CN | 101584157 B | 12/2013 |
| CN | 103414917 B | 4/2017 |
| EP | 1976202 A2 | 10/2008 |
| EP | 2074762 B1 | 4/2015 |
| GB | 2428529 | 1/2007 |
| IL | 197687 | 7/2013 |
| JP | H 10-41954 | 2/1998 |
| JP | 2000216815 | 8/2000 |
| JP | 2000333231 | 11/2000 |
| JP | 2002010332 | 1/2002 |
| JP | 2002152310 | 5/2002 |
| JP | 2002344965 | 11/2002 |
| JP | 2003152787 | 5/2003 |
| JP | 2005065207 | 3/2005 |
| JP | 2005341310 | 12/2005 |
| KR | 101223950 B1 | 1/2013 |
| WO | 03 036886 A2 | 5/2003 |
| WO | 2003098850 | 11/2003 |
| WO | 2005055524 | 6/2005 |
| WO | 2005060300 | 6/2005 |
| WO | 2005109789 | 11/2005 |
| WO | 2008/038261 A2 | 4/2008 |
| WO | 2009093252 | 7/2009 |
| WO | 2011075739 | 6/2011 |
| WO | 2013/171648 A1 | 11/2013 |
| WO | 2014/036640 A1 | 3/2014 |
| WO | 2014/055680 A2 | 4/2014 |
| WO | 2015/188935 A1 | 12/2015 |

OTHER PUBLICATIONS

Quentin De Coninck and Olivier Bonaventure, "Multipath QUIC: Design and Evaluation", 13th International Conference on emerging Networking EXperiments and Technologies (CoNEXT 2017), Dec. 12-15, 2017; Downloaded from: https://multipath-quic.org.

International Search Report for PCT application PCT/IL2017/051331, dated Mar. 13, 2018.

Written Opinion of the International Searching Authority for PCT application PCT/IL2017/051331, dated Mar. 13, 2018.

Wikipedia, "TCP Congestion Control", downloaded from the Internet on Jul. 14, 2019 from: https://en.wikipedia.org/wiki/TCP_congestion_control.

Wikipedia, "Head-of-line blocking", downloaded from the Internet on Jul. 15, 2019 from: https://en.wikipedia.org/wiki/Head-of-line_blocking.

Wikipedia, "Multipath TCP", downloaded from the Internet on Jul. 15, 2019 from: https://en.wikipedia.org/wiki/Multipath_TCP.

Wikipedia, "Transmission Control Protocol", printed on Jul. 16, 2019 from: https://en.wikipedia.org/wiki/Transmission_Control_Protocol.

The Internet Engineering Task Force (IETF), "TCP Congestion Control", Request for Comments (RFC) 5681, Sep. 2009.

Information Sciences Institute—University of Southern California, "Transmission Control Protocol", Request for Comments (RFC) 793, Sep. 1981.

Information Sciences Institute—University of Southern California, "Internet Protocol", Request for Comments (RFC) 791, Sep. 1981.

Network Working Group, "TCP Extensions for High Performance", Request for Comments (RFC) 1323, May 1992.

Network Working Group, "TCP Selective Acknowledgment Options", Request for Comments (RFC) 2018, Oct. 1996.

Network Working Group, "The TCP Maximum Segment Size and Related Topics", Request for Comments (RFC) 879, Nov. 1983.

Internet Engineering Task Force (IETF), "The NewReno Modification to TCP's Fast Recovery Algorithm", Request for Comments (RFC) 6582, Apr. 2012.

Network Working Group, "TCP Slow Start, Congestion Avoidance, Fast Retransmit, and Fast Recovery Algorithms", Request for Comments (RFC) 2001, Jan. 1997.

Network Working Group, "Increasing TCP's Initial Window", Request for Comments (RFC) 3390, Oct. 2002.

Network Working Group, "TCP Extensions for Long-Delay Paths", Request for Comments (RFC) 1072, Oct. 1988.

Network Working Group, "TCP Congestion Control", Request for Comments (RFC) 2581, Apr. 1999.

Internet Engineering Task Force (IETF), "TCP Extensions for Multipath Operation with Multiple Addresses", Request for Comments (RFC) 6824, Jan. 2013.

Internet Engineering Task Force (IETF), "Coupled Congestion Control for Multipath Transport Protocols", Request for Comments (RFC) 6356, Oct. 2011.

Internet Engineering Task Force (IETF), "Architectural Guidelines for Multipath TCP Development", Request for Comments (RFC) 6182, Mar. 2011.

Internet Engineering Task Force (IETF), "Multipath TCP (MPTCP) Application Interface Considerations", Request for Comments (RFC) 6897, Mar. 2013.

Internet Engineering Task Force (IETF), "Use Cases and Operational Experience with Multipath TCP", Request for Comments (RFC) 8041, Jan. 2017.

Institute of Electrical and Electronics Engineers (IEEE), "Part 3: Carrier sense multiple access with collision detection (CSMA/CD) access method and physical layer specifications", Standard 802.3, Mar. 2000 Edition; Clause 43, "Link Aggregation", pp. 1254 to 1317.

Institute of Electrical and Electronics Engineers (IEEE), "Information technology—Telecommunications and information—exchange between systems—Local and metropolitan area networks—Specific requirements—Part 1AX: Link Aggregation", IEEE standard 802.1AX, First Edition, Jan. 15, 2016; "Table of Contents", pp. (i) to (xx).

Machine Translation of JP 2002010332 Generated online at Japanese patent office website on May 1, 2013.

Machine Translation of JP 2005065207 Generated online at Japanese patent office website on May 1, 2013.

Machine Translation of JP 2002344965 Generated online at Japanese patent office website on May 1, 2013.

Machine Translation of JP 2003152787 Generated online at Japanese patent office website on May 21, 2014.

Machine Translation of JP 2005341310 A Obtained from "Google Patents" on Jul. 23, 2019.

Machine Translation of JP 2000216815 A Obtained from "Google Patents" on Jul. 23, 2019.

Machine Translation of JP H 10-41954 A Obtained from "Google Patents" on Jul. 23, 2019.

Machine Translation of JP 2000333231 A Obtained from "Google Patents" on Jul. 23, 2019.

(56) References Cited

OTHER PUBLICATIONS

Machine Translation of JP 2002152310 A Obtained from "Google Patents" on Jul. 23, 2019.
Machine Translation of CN 1506857 A Obtained from "Google Patents" on Jul. 23, 2019.
Bibliographical Data and Abstract of HK 1137278(A1) Printed from Espacenet on Jul. 23, 2019.
Masayoshi Kobayashi et al., "Maturing of Open Flow and Software-defined Networking through deployments", Computer Networks 61 (2014) 151-175.
Ford et al., "TCP Extensions for Muitipath Operation with Multiple Addresses", Internet Engineering Task Force (IETF), draft IETF mptcp rfc-6824-bis-09, Jul. 28, 2017.
Internet Engineering Task Force (IETF), "Threat Analysis for TCP Extensions for Multipath Operation with Multiple Addresses", Request for Comments (RFC) 6181, Mar. 2011.
Internet Engineering Task Force (IETF), "Analysis of Residual Threats and Possible Fixes for Multipath TCP (MPTCP)", Request for Comments (RFC) 7430, Jul. 2015.

* cited by examiner

DEVICE, SYSTEM, AND METHOD OF DATA TRANSPORT WITH SELECTIVE UTILIZATION OF A SINGLE LINK OR MULTIPLE LINKS

CROSS-REFERENCE TO RELATED APPLICATIONS

This patent application claims benefit and priority from U.S. 62/689,255, filed on Jun. 25, 2018, which is hereby incorporated by reference in its entirety.

This patent application is also a Continuation-in-Part (CIP) of PCT international application number PCT/IL2017/051331, having an international filing date of Dec. 10, 2017, published as international publication number WO 2018/211488 A1; which claims benefit and priority from application U.S. 62/507,805 (filed on May 18, 2017) and from application U.S. 62/553,931 (filed on Sep. 4, 2017); and all of the above are hereby incorporated by reference in their entirety.

This patent application is also a Continuation-in-Part (CIP) of U.S. Ser. No. 15/509,339, filed on Mar. 7, 2017; which is National Stage of PCT international application number PCT/IL2015/050917, having an international filing date of Sep. 8, 2015, published as international publication number WO 2016/038611 A1; which claims benefit and priority from U.S. 62/047,252, filed on Sep. 8, 2014; and all of the above are hereby incorporated by reference in their entirety.

FIELD

The present invention relates to the field of electronic communications, and particularly to systems that send and/or receive data.

BACKGROUND

Millions of users worldwide utilize electronic devices on a daily basis, such as, laptop computers, desktop computers, smartphones, tablets, or the like. These devices are utilized for a variety of purposes; for example, to send and receive electronic mail (email) messages, to browse the Internet or the World Wide Web, to play games, to watch videos, to engage in Instant Messaging (IM), to perform electronic commerce (e-commerce) transactions, or the like.

Many of those electronic devices often transmit data and/or receive data. For example, a laptop computer may be utilized for downloading a file via a Wi-Fi wireless communication connection. Similarly, a smartphone may be utilized for uploading or watching an online video via a 4G cellular transceiver.

SUMMARY

The present invention provides devices, systems, and methods of data transport with selective utilization of a single link or multiple links. For example, a system may selective determine (i) to utilize a single-link connection in order to send (or receive) a small-size file or data-item or payload, or conversely, (ii) to utilize a bonded or aggregate connection formed of multiple links in order to send (or receive) a large-size file or data-item or payload. For example, in some embodiments, the overhead of dividing packets of a small-size file in order to transmit them across multiple communication links, and then to re-assemble the packets in order at the recipient device, may not warrant the utilization of a bonded multi-link connection for such transmission; and the system may select in advance (or, during such transmission) to revert to single-link transmission of such payload.

The present invention may provide other and/or additional benefits and/or advantages.

DETAILED DESCRIPTION OF SOME DEMONSTRATIVE EMBODIMENTS OF THE PRESENT INVENTION

The invention relates to the field of wireless communication, cellular communication, fixed communication, wired communication, networking, routing, and transmitting and receiving of data.

Figure 1:
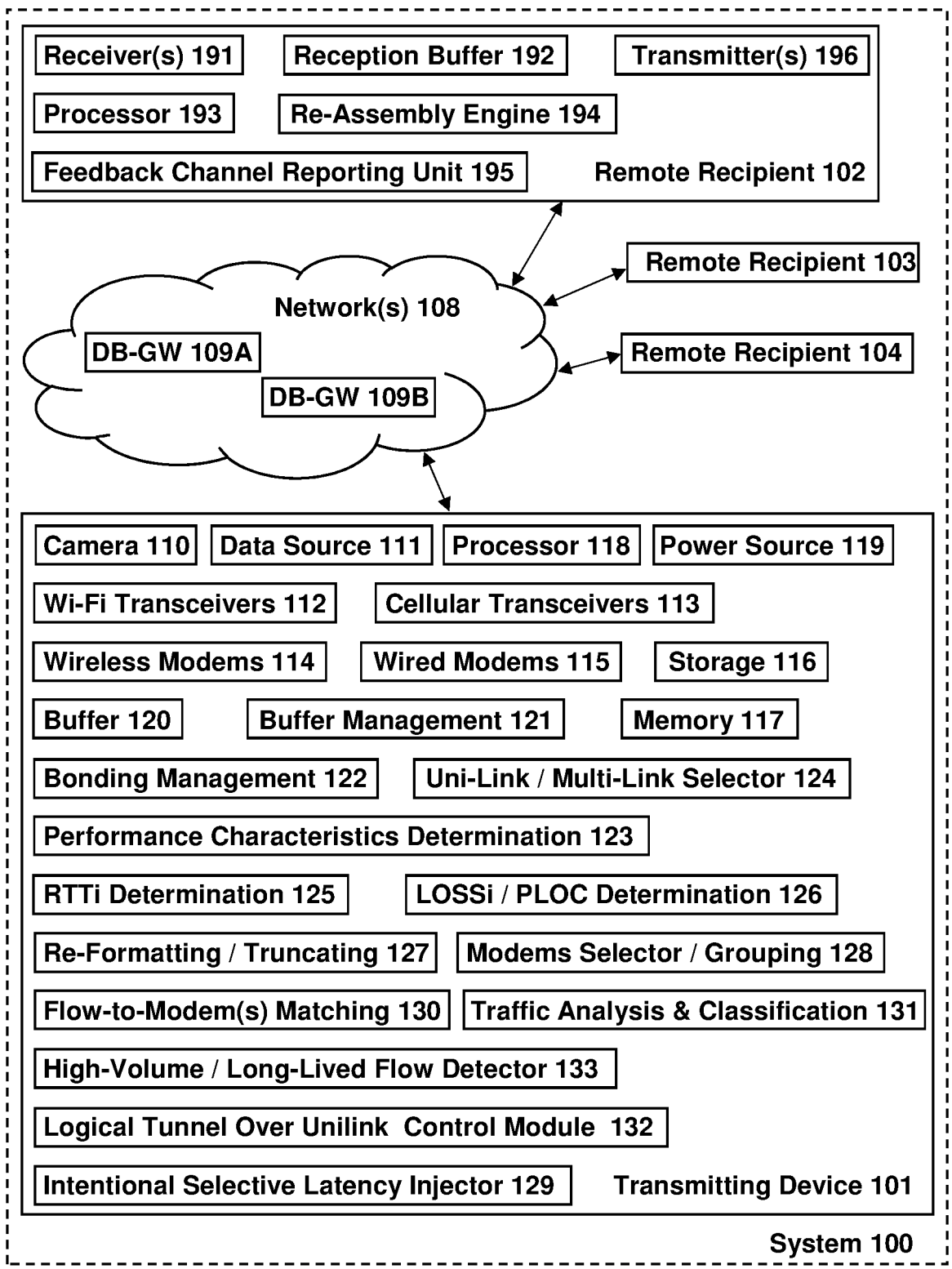
FIG. 1 is a schematic block-diagram illustration of a system, in accordance with some demonstrative embodiments of the present invention

Reference is made to FIG. 1, which is a schematic block-diagram illustration of a system 100, in accordance with some demonstrative embodiments of the present invention. System may comprise a transmitting device 101, which transmits or sends data to one or more remote devices or remote recipients which are referred to as recipient devices or destination devices or remote recipients 102-104. Other number of transmitting device(s) and/or destination device(s) may be used. The data is transported through or via or across one or more communication networks, showing for demonstrative purposes a communication network 108 although multiple network may be used (e.g., in series, in parallel, or the like).

Transmitting device 101 may organically generate internally therein the data intended for transmission; for example, by having a camera 110 in the transmitting device and/or operably coupled to the transmitting device or otherwise connected to the transmitting device (e.g., via a cable, a wire, a wireless link, or the like), such that video data captured by the camera 110 is intended for transport or transmission or uploading towards one or more of the remote destinations. Additionally or alternatively, transmitting device 101 may be operably associated with, or may be in communication with, or may comprise therein, a data source 111, which may be local or remote, and/or may be internal or external or separate from transmitting device 101, and such data source 111 may store or may feed or provide to transmitting device 101 the data to be transmitted to the one or more remote recipients; such data source may be or may include a repository or a storage unit or a memory unit, or a database or a data-storage apparatus, or may be a cloud-based repository or computer, or may be a data-generating unit or a data-acquisition unit, or the like.

Transmitting device 101 may comprise multiple transmitters or transceivers or transmitting units which may be of the same type and/or of different types; for example, one or more Wi-Fi transceivers 112 or IEEE 802.11 transceivers, one or more cellular transceivers 113, one or more wireless modems 114 able to communicate via a satellite communication link and, one or more wired modems 115 able to communicate via wired communication link(s), or the like.

Transmitting device 101 may further comprise a storage unit 116 for long-term storage of data (e.g., a Hard Disk Drive (HDD), a Solid State Drive (SDD), a non-volatile storage unit, a Flash based storage unit, or the like) and/or a memory unit 117 for short-term storage of data (e.g., Random Access Memory (RAM), or Flash based memory unit); as well as a processor 118 able to execute code or instructions (e.g., a Central Processing Unit (CPU), a Graphics Processing Unit (GPU), a Digital Signal Processor (DSP), one or more processing cores, an Integrated Circuit (IC), a controller, or the like). Transmitting device 101 may comprise a power source 119 (e.g., a battery, a rechargeable battery, a replaceable battery, a power cell, or the like), and/or may be connected or coupled to an external power source (e.g., mains power, electric socket, mobile or non-mobile power generator, vehicular power source, or the like).

Transmitting device 101 may be implemented as a stand-alone device or an autonomous device; or as a unit or sub-unit of another apparatus or system; or may be integrated with or within another apparatus (e.g., a vehicle, a vehicular dashboard, a vehicular entertainment system, a drone, an Unmanned Aerial Vehicle (UAV), an autonomous car or vehicle or drone or UAV, a remote-controlled or remotely-controlled or remotely-operated car or vehicle or UAV or drone, a self-driving or self-operating car or vehicle or drone or UAV), or the like.

Transmitting device 101 may comprise a transmission buffer 120, which may temporarily store some or all of the packets or payload or data that is intended for transmission or for uploading or for sending to one or more remote recipients or remote destinations. Optionally, a buffer controller unit or a buffer management unit 121 may manage such buffer and its content, may pull or fetch additional data into the buffer from the source of the payload to be transmitted, may release data-portions or packets from the buffer towards the transmitter(s) or the transceiver(s) or modem(s) that will perform the actual transmitting and/or towards another unit or module of transmitting device 101 which may handle or facilitate such transmission.

A bonding management unit 122 of transmitting device 101 may operate to create and/or configure and/or modify the properties a bonded or aggregated multiple-link communication channel that is comprised of multiple communication links (e.g., each link being a point-to-point communication link, or a single-sender to single-recipient communication link). The bonding management unit 122 may perform one or more suitable operations; for example, adding a communication link to the bonded communication channel; removing a communication link from the bonded communication channel; temporarily pausing utilization of a particular communication link in the bonded communication channel; analyzing performance characteristics of one or more of the used communication links and/or of the available (utilized or non-utilized) communication links and/or of the bonded communication channel in the aggregate; modifying an allocation scheme for allocating packets or data-portions to different communication links; or the like.

A packet allocator 123 may operate to dynamically allocate packets for transmission, from a payload-segment or payload-portion or file that is intended for transmission, across or among the various modems and/or transceivers that are currently available and that are currently participating in the bonded transmission; optionally in an inequitable or non-even manner, such that a first particular modem or transceiver may be allocated a first number of packets for transmission (e.g., 25 packets, which may have consecutive order numbers, or which may be non-consecutive to each other) while a second particular modem or transceiver may be allocated a second and different number of packets for transmission (e.g., 63 packets, which may be consecutive to each other, or which may be non-consecutive to each other), based on one or more properties or characteristics or criteria or rules for such allocation; and taking into account, for example, the performance of each such modem or transceivers, its error rate, its packet loss rate, its packet re-transmission rate, its latency or lag or delays, its operational costs (e.g., allocating more packets to a particular modem or transceiver that is associated with lower monetary costs to transmit packets), its bandwidth, its throughput, its goodput, and/or other parameters or characteristics, which may be momentary and/or current and/or historical and/or recent and/or predicted and/or estimated and/or actually-measured. Optionally, a Performance Characteristics Determination Unit 123 may operate to determine, generate and/or analyze the above-mentioned performance characteristics.

In a demonstrative example, remote recipient 102 may be a recipient device having one or more receivers 191, able to receive the incoming packets from the one or more communication links that are utilized for transporting the payload from the transmitting device 101 to the remote recipient 102 over the one or more communication networks 108. The incoming packets may be placed in a reception buffer 192, or other memory unit or storage unit of the remote recipient. A processor 193 and/or a re-assembly engine 194 of the remote recipient 102 may re-arrange the incoming packets and/or the already-received or already-buffered packets, to correctly re-assemble a copy of the original data-item or a data-stream or a payload that was intended to be transported from the transmitting device 101 to the remote recipient 102.

Optionally, a feedback channel reporting unit 195 may send back to transmitting device 101, via a dedicated feedback channel and via one or more transmitters 196 of the remote recipient 102, feedback data and/or aggregated statistics and/or performance characteristics data, based on analysis of the received packets; for example, error rate, rate of missing or erroneous packets, rate or number of re-transmission requests, or the like; and the transmitting device 101 may utilize such feedback data, received from the remote recipient 102, in order to modify and/or re-configure the bonded communication channel, and/or in order to modify the allocation scheme that allocates packets across multiple modems or transceivers, and/or to add or remove a communication link to (or from) the bonded communication channel, and/or to perform other suitable modifications to dynamically accommodate the reported feedback.

The Applicants have realized that bonded or aggregated connections or communications links may be used for transmitting or delivering or transporting Transmission Control Protocol/Internet Protocol (TCP/IP) packets or TCP-based packets, as well as User Datagram Protocol (UDP) packets or UDP-based packets, or flow of packets; and that such bonded multiple-link connection may be well suited for transporting or transmitting data-flows which may be referred to as "elephant flows", e.g., transfers of a significant amount of data (e.g., 47 Megabytes, or 260 Megabytes, or a payload that is greater than 1 Megabyte, or the like) which is transmitted to the same Internet Protocol (IP) destination address or to the same single recipient; and/or may be suitable for long lived transports, e.g., a transport which spans a long duration of streamed packets between the same origination IP address and the same destination IP address.

The Applicants have realized that such bonded multiple-link connection may perform less optimally (or even poorly) in other situations or on small-size payload, or in situations that are less efficiently suited for transporting data-flows; such as in data-flows which may be referred to as "mice flows", e.g., small-size data-flows, such as being TCP-based or UDP-flows flows which are low in volume and/or in number of times (e.g., a data-flow of 6 kilobytes, transported one time only from a single sender to a single receiver), and/or being short-lived. In some scenarios, such "mice flows" may include bursts of communication such as some HTTP or similar requests of a client from a server including the invocation of subsequent handshake or authentication or authorization or brief exchange of some data or packets or short-lived server response. The Applicants have realized that such "mice flows" may be common in various IP-based transport protocols and systems, and sometimes may even characterize most of the data streams being delivered in such IP systems.

The Applicants have also realized that when using multiple-link bonding or aggregation for transporting of "elephant flows", the location of a Data Bridge gateway (DB-GW) on the network might impact the overall end-to-end Round-Trip Time (RTT) of flows, which might discourage TCP senders (or, which may cause TCP-based transports to be less efficient and/or to become congested), by creating a small or too small or excessively-small Congestion Window (CWND). This might result in stalled communications, congested communications, inefficient communications, long-buffered communications, and/or reduction of the utilized bandwidth even though sufficient bandwidth may actually be available in each one of the communication links and/or in their combined throughput; or may cause inconsistent or unpredicted or unreliable performance for the bonded communications, and/or inconsistent, or variable or unexpected or sudden latencies (or delays), or unpredicted bandwidth changes in the communications, and/or overall poor performance or inefficiency or sub-optimal performance of the bonded communications compared to the potential one, or compared to the potential when using a DB-GW in another location with other "last hop" connectivity performances. Therefore, a multi-DB-GW cloud architecture may be utilized, in accordance with the present invention, to enable selection of the optimally located GW or DB-GW for the specific elephant flow that needs to be transported. Such selection or determination may be made dynamically, optionally in real-time or in near-real-time and/or based on current transport performance characteristics and/or based on current network characteristics or performance, by the operator's proxy networking devices and/or by any of the end devices participating in the bonded communication, and/or by any management algorithm or management control unit that is involved in such communication.

Some embodiments may provide one or more dynamic (or, dynamically allocated) cloud-based DB-GW servers or DB-GW units, that may be distributed geographically in order to provide optimized location depending on the IP location of the destination Server/IP host/recipient. For demonstrative purposes, two such DB-GW Units 109A-109B are shown, although other number of DB-GW units may be used. Each DB-GW unit may be implemented using a physical unit and/or using virtualized components (e.g., a Docker container).

The Applicants have realized that sending, or delivering or transmitting TCP-based or similar handshake protocol packets (including UDP-based with higher layers including in the application-layer or in the transport layer utilizing handshake) of "mice flows" over a bonded multiple-links virtual connection, may result in degraded performance or inefficiency for such a flow in terms of potentially long-delays in the midst of the transmission, and/or lost packets and/or packet re-transmissions which also burden and unnecessarily load or over-load the involved networks and network elements and network nodes, and/or causing degraded total bandwidth, and/or degraded performance of communication resources which deliver or transport other packets to be transmitted by that system to different IP destinations and/or belonging to other IP streams or belonging to other flows, including TCP or UDP based streams. Such degraded performance may also include, in some scenarios, stalled communications, long-buffered communications, network congestion, reduced utilized bandwidth even though sufficient bandwidth is available in each of the links or in their combined throughput, inconsistent or unpredicted performance for the bonded communications including inconsistent, variable or unexpected delays (or latencies) or bandwidths in the communications, and/or otherwise or overall poor performance of the bonded communications compared to the potential one from the aggregation of the participating connections. Such degradation in performance may be because, for example, the bonded or aggregated link as a whole, or in parts involving some of the connections or modems or transceivers that it consists of, are engaged or are busy or pending or awaiting in the slowed-down TCP connection caused by such non-optimal transmission of a "mice flow" which occupies or burdens multiple resources and is temporarily stuck on transporting a small-sized one-time data-flow to a single IP recipient.

The Applicants have realized that this may further occur in wireless connections, where latency and other performance characteristics of any single connection or link (or modem, or transceiver) may change or may fluctuate in a few milliseconds (or even smaller time period, or longer time period), in real time or near real time, resulting in (at least in some cases) an overall relatively or absolutely long transmission time or long or prolonged Round Trip Time (RTT) (e.g., comprised of the bi-directional transmission and the receiving from the receiving end its response or receiving a response of a proxy unit on its behalf) of a TCP or UDP packet and its own or layered associated handshake protocol response packet.

The Applicants have also realized that this may also occur when the variance in performance between (i) at least one connection in a bonded multi-link virtual connection, and (ii) at least one other connection, is permanently or temporarily relatively or absolutely or sufficiently large. For example, the RTT of one cellular-based connection at one point is 20 milliseconds or 50 milliseconds; whereas the RTT of another modem or transceiver in the same bonded virtual connection is, for example, 100 or 150 milliseconds respectively or longer, at the same transmission period or during an at least partially overlapping time slots. In some of these cases, the virtual link-bonding transmitting device may be significantly slowed down, so that the total goodput or effective throughput of its multiple (N) connections, is not equal or near equal to, or in the order of, the combined goodput (or throughput) of its N connections or is not any function of it, but rather, it may even be as low as in the order of the rate or goodput or throughput of a single connection out of the N connections (e.g., the worst-performing link of the N connections), and/or may be equal to or similar to the slowest one of them all.

Similarly and relatively equally to measuring the RTT, uni-directional latency may be measured or referred to. Since RTT is comprised of the latency in both directions, if the latency in one direction is known or predicted, many times it is sufficient for the purposes of this invention. For example, if the uplink latency of one modem or connection is measured and is sufficiently different than that of a second or third modems, i.e. for example by more than 100 milliseconds or another value, then it may be deduced with sufficient probability that the RTT will also be sufficiently different between these same modems. In such a case the processors may decide to distinguish between these modems at that point in time to two or more separate transmission groups so that TCP-based or similar "elephant streams" shall not use both modems bonded, but use a more homogenously performing modems. Similarly, the downlink latency may be used as the decision or deduction parameter instead of, or complementing to, the full RTT.

The Applicants have realized that such permanent or temporary slowdowns and bandwidth drops, as well as increased latencies, might make the multiple-link bonding system less efficient or even useless some the extreme situations, and/or at least ineffective or less effective, either permanently or temporarily or in specific cases, or particularly in some congestions or networks or locations or countries or geographical regions or with regard to data transports of particular applications or type-of-application (e.g., High Definition or 4K streaming video; real-time video conference; or the like). Such slowdowns may be referred to as "head-of-line blocking". As just one example for such applications, live or real-time video delivery might be negatively affected by such long latency even if the video stream itself is transmitted over UDP, yet if there are at least some TCP-based packets of at least one TCP-based stream transmitted at least part of the time over that same bonding connection or over a connection using at least one of the modems or connection being used for the video transmission.

The Applicants have also realized that the same or similar mechanisms of the present invention, may also be implemented for TCP-based streams, UDP-based streams, non-TCP based streams, non-UDP based steam, combined TCP- and-UDP based streams or data-flows or transports, IP based streams or data-flows, TCP/IP streams or data-flows, or any other IP-based stream, "mice flows" and "elephant flows" as described above. Similarly, a short lived UDP-based stream, or a low volume UDP-based stream, may be served by a single non-bonded connection rather than being served via a bonded multiple-link connection. The benefits for the UDP-based stream itself may be, for example, reduced latency (due to not using any bonding mechanism such as re-ordering or re-assembly buffers or others), while still meeting its bandwidth and other performance requirements or goals. Thus, for critical mission and ultra low latency applications and their respective packet flows or data flows, serving the UDP-based (or TCP-based) transport using uni-link or unilink (e.g., a single communication link in which a single transceiver or modem transmits packets over a single communication link towards a single recipient), rather than utilizing a bonded multiple-links connection (in which two or more communication links, of two or more transceivers or modems or transmitters, transmit packets that are inequitably distributed across the multiple links and are then re-assembled in their right order at an assembly engine at the recipient side), the utilization of the present invention may be beneficial. Bonding or link aggregation may also be termed "bandwidth aggregation".

The benefits for the apparatus or the communication system as a whole are, for example, that resources of its multiple connections (or modems, or transmitters, or transceivers) are used more efficiently and in tighter correlation to the needs, allowing more applications and IP streams and overall packet volumes to be served by it, and/or reducing processing and memory utilization, heat generation, increasing runtime over batteries, providing a better Quality-of-Service (QoS) or Quality-of-Experience (QoE), and/or providing other benefits. In cases where the system of the present invention identifies that the nature of the packet stream is relatively long-leaved, continuous rather than a "bursty" or burst-like flow or one-time/single-delivery flow, or high-volume of packets, or due to other performance requirement consideration, the system of the present invention may start (or re-start) to utilize a bonded multi-link connection based on multiple transceivers/modems, or other multiple-link topology or architecture or transport method, to deliver that stream.

In accordance with the present invention, "mice flows" or a "mouse flow" may be transmitted via one of some alternative networking schemes, each of which refers (for example) to one of the following two demonstrative use cases: (1) when the destination servers are on the Internet, and allowing of ingress traffic is not desired; or (2) when the traffic belongs to or is handled within a private network. For example, in use-case (1), the data flows would be routed more efficiently by the transmitting unit acting as a multi-WAN router (or in a multi-path mode). In use-case (2), the "mice flows" should be transmitted to the DB-GW via one of the logical interfaces between one of the unit's mobile modems to the DB-GW in (for example) a link aggregation mode (e.g., in accordance with IEEE 802.3ad, or IEEE 802.1AX or other).

In some embodiments, since the transmitting unit and the GW "do not know" or not necessarily know when a TCP or UDP flow starts, whether or not, or if or when, it will develop into an "elephant flow", the transmitting unit or the DB-GW may assume that every new flow is a mice flow or a mouse flow. It shall therefore "Hash" this new stream or rout it or queue it or similarly manipulate it into one of several possible Unit-to-DB-GW logical tunnel links (or connections) as it would have happened in Link Aggregation Group/LAG forwarding in order to be delivered or transmitted over that logical tunnel; such as, usually, via non-bonding (non-bonded) unicast transport. Only when a flow develops into a bandwidth-demanding TCP or UDP flow. will the transmitting unit or the DB-GW move or switch this flow or stream into a multiple-link bonded stream. When bonding is determined and initiated for this stream, then (e.g., as described below), a predicted optimized set of used interfaces (modems, transmitters, transceivers) may be chosen (e.g., dynamically, in real time, or in near real time) for transporting the specific flow, and the time that a packet waits for a delayed packet in the jitter queue may be reduced or optimized according to the specific TCP flow RWND size (the size of the Receiver Window). The utilized set of interfaces may be changed dynamically at any point in time due to the performance of each of the participating links and of the required or demanded or desired performance of the packet stream. This optimization aims to (A) create, from a relatively heterogenous momentary connections, a relatively or sufficiently homogeneous sets or groups of connections or modems, in terms of their relevant momentary performances compared to each other; and (B) optionally, in accordance to the specific needs of the flows to be delivered. This shall reduce the momentary level of heterogeneous performance between the modems or connections that makes TCP-based or other similar handshake-based connections potentially degraded in performance (stability, aggregated bandwidth, latencies, etc.), to a momentary level closer to homogeneity which allow a more consistent, stable and higher aggregated bandwidth with smaller momentary or average latencies.

Further, in TCP-based or other similar handshake-based or flow-control-based transport protocols transmission, once a transmission rate drops or decreases, the recovery, or increasing the bandwidth again even not to the same order of bandwidth of before the drop, takes time. For example, the gradual increase from the dropped rate to higher transmission rates is usually relatively or absolutely slow, gradual with several steps, due to the need to receive the handshake from the destination or proxy side, then wait till system stabilization and go to the next step rate. The Applicants have realized that this creates a prolonged impact on the overall transmission rate, and/or on the possibility to transmit data for applications that need a more stabilized (or almost fixed, or little-changing) transmission rate such as some live video transmission. The Applicants have realized that some TCP strategies, such as "slow start", may pick up the transmission rate incrementally, and similarly do other TCP algorithms such as "TCP Foo" algorithms. The Applicants have also realized that when using bonding of multiple links into a bonded connection, in which compressed or non-compressed encapsulated IP packets of video is divided or split between (or across) two or more modems or transmitters or transceivers or connections or routes, then the recovery of the whole virtual bonded link consisting of these multiplicity of connections is also prolonged, being impacted from at least one slow connection or dropped rate on one of the multiple connections that were bonded. The prolonged impact on the single TCP-based transmission and/or over additional packets or streams or the whole transmitting system, are unnecessarily prolonged, thus amplifying the negative effect of even single momentary performance drop on any single modem or transceiver. This is further amplified in a bonded connection if the drops happen occasionally on more than one of the connections or modems. This may happen particularly with wireless connections, such as cellular, Wi-Fi, Dedicated Short-Range Communications (DSRC), or others, as well as during mobility (e.g., transmission on the move; transmission while the transmitting entity is moving geographically) such as for trains, cars, busses, motorcycles, drones, helicopters, airplanes, boats, ships, aircraft, ground transportation, air transportation, vehicles, autonomous vehicles, self-driving vehicles, or others.

The Applicants have realized that when having available more than a single IP connection, or more than a single available transport route, and having at least some of the traffic to be delivered as IP packets over TCP-based or similar transport methods, an optimization of the delivery process may be made based on the TCP performance and especially the TCP receiving window (or TCP window, or TCP receiver window, or RWND) size or sizes of multiple such parameters of one or more of the TCP or TCP-like or TCP-based streams to be delivered. For example, the TCP receive window is transmitted to the packet address originator in the TCP header (encapsulation). Other indicators which may be used for this purpose may be, for example, the Congestions window size (CWND), the occurrence (and/or timing, and/or frequency, and/or number of) duplicated TCP acknowledgements, expiration of transmission RTT signal timers, and/or other indicators or parameters within (or related to) the TCP or TCP-based or similar protocols. The same applies for any other IP protocols similar to TCP, such as but not limited to MP-TCP (Multi Path TCP), or some variations of the multipath QUIC or Multi-Path QUIC (MPQUIC) protocol (originally a UDP based transport protocol), or other stateful protocols (protocols involving state machine or handshakes or flow control or congestion control), or others.

Further, some bonding systems may require a proxy server or a proxy unit or a proxy node or a proxy network element, between the transmitter unit and the end destination (the final recipient). This Proxy unit, which may sometimes be referred to as a "receiver", gathers the packets that were transmitted on the various multiple connections or modems or networks or routes, decapsulates them from the bonding-specific protocol encapsulation, re-assembles them to a coherent IP stream of the original content, and informs back or feeds back (e.g., to the transmitter) one or more/various transmission related data, latency information, error rates, received or missing packets, re-transmission requests, re-transmission operations, statistics, predictions, estimates, or any combination or processing of the above. The Applicants have realized that it may be beneficial if bonding-based multiple-links transmission would be done without necessarily utilizing such receiver or proxy unit, and in actuality without any bonding protocol or encapsulation on top of (or in addition to) the TCP or other standard IP protocols. The implementation, devices and systems would be simplified, the cost may be reduced both in development and in deployment and maintenance, the scalability in supporting many end-nodes may be achieved quickly and easily; and other benefits may be achieved.

The Applicants have realized that there are various mechanisms (such as "CUBIC TCP") that attempt to handle TCP congestion issues, typically for a single-link connection. However, such mechanisms and protocols are imperfect, and do not necessarily yield optimal data transports; and/or particularly when one or more wireless communication links/modems/transceivers are utilized; and/or particularly when the data transport includes a mix of both "elephant flows" and "mice flows" in a non-predictable manner.

The Applicants have realized that these and other deficiencies described herein have not been resolved, particularly for the multilink cases involving at least one flow of TCP-based transmission or other congestion control or flow control protocols transmission. The present invention resolves these and other problems with an optimization of selection and usage of at least one of the available modems or transmitters or transceivers or connections or links, for at least one of the TCP-based packets or data-flows that are to be transmitted.

In some embodiments of the present invention, an optimization process may result in sending some TCP over IP or similar (or in short TCP) streams over any one or more single, stand-alone (e.g., non-bonded, non-aggregated) connections, whereas at the same time, or simultaneously, or quasi-simultaneously, or concurrently or partially concurrently, or during a time-slot that is at least partially overlapping, packets of other TCP streams may be sent, or transmitted, at any order of packets and momentary combination of connections over a bonded or aggregated virtual broadband link comprised of more than a single connection, such as two or three or more connections or modems or transmitters or transceivers of the same or different operators, technologies, networks, vendors, base-stations and/or other proxy devices, or other properties mix or combination. In such a bonded link, the packets may be encapsulated with bonding-transmission protocol packets, transmitted over any combination of the associated connection; and at the other end node, which is an IP destination address or routed from it, a software unit and/or hardware unit are used to reassemble the packets being sent over each of these associated connections into a single coherent and ordered stream of original packets decapsulated from the bonding protocol encapsulation, and output it further to its final destination IP address or other usage (e.g., playback, consumption, storage, or the like), as indicated in their bonding-encapsulation protocol or internal original protocols. In some embodiments, the transmitting device 101 may comprise a Uni-Link/Multi-Link Selector 124, which may be responsible for making the decision or the determination of whether to utilize a uni-link or a single communication link for transmitting a payload or a payload-portion from transmitting device 101 to remote recipient 102, or conversely, whether to utilize a bonded communication channel that comprises two or more bonded-together communication links in order to transport that particular payload or payload-portion. The Uni-Link/Multi-Link Selector 124 may operate by taking into account one or more, or some, or all, of the various criteria or rules or conditions that are described above and/or herein.

In some embodiments, the process may comprise directing or choosing or selecting (and later, re-selecting, or modifying or updating the selection) one or more IP based flows, in full or just some of their packets of a subset or group of the packets, both TCP-based and UDP-based or only one of them, to be transmitted over or using at least one specific connection, or modem, or transceiver, or operator, or network, or link, in a system that has multiple links associated with it and available for its use of delivering or transmitting packets. The selection may be based on one or more properties of the TCP receive window of at least one of such streams. Such connection selection or modem selection for at least some of these TCP-based streams includes, for example, selecting their delivery to be performed over a single-modem connection and over a bonded multi-link virtual broadband connection consisting of a multiplicity of such modems.

Such selection may change (or may be updated) dynamically according to the performance of each of the associated modems and/or of other modems and/or predictive performance and/or predictive or known desired performance, or based on actual or estimated or measured or predicted performance characteristics; or based on to-be-transmitted volume or type of traffic, or based on any other property of the traffic, momentary, heuristic, learnt, measured (e.g., relating to past performance or historic performance), deduced, or otherwise evaluated or estimated or predicted (e.g., related to future or forward-looking performance as currently estimated).

In some embodiments, the system and process of the invention may multiply or may increase the goodput or throughput or effective bandwidth of a TCP flow and/or of the whole transmission system which is comprised of several flows, UDP and/or TCP; and may even multiple it by 4 to 10 times; especially if the {RTTi, LOSSi} differences between (i) at least one of the available or used modems or connections, and (ii) at least one of the others in the bonded virtual link, are a significant difference, such as one of them being twice of the other. As used herein, the term "RTTi" indicates the RTTi value indicates the estimated RTT of a segment, after segment number "i" (the i-th segment) was transported successfully (namely, was ACK'ed). As used herein, the term "LOSSi" or "Lossi" or the term Packet-Loss Occurrence Characteristic (PLOC) denotes an indicator for the amount and/or frequency and/or number of lost packets that have occurred in segment "i" or that are expected to occur in the transport of segment "i". The values of these parameters may be dynamically calculated or determined, for example, by an RTTi Determination Unit 125 and/or by a LOSSi/PLOC Determination Unit 126, respectively; which may be part of the transmitting device 101, and/or may optionally be implemented as part of a separate network element.

As an example of some embodiments, RTTi is the average Round-Trip Time measured over a time window (e.g., it may be a configurable time-window; may have a fixed size or time-length, or may have a time-length that is determined by the system dynamically based on various criteria or conditions). As an example of some embodiments, the LOSSi value or the PLOC value is the average loss rate as measured (or as estimated, or determined) over the same time window. The transmitting entity (e.g., a Bonding transmitter or streamer or other transmitting device) sends or transmits at least some representative packets, or all packets, or any other packet distribution portion or batch or group of packets, with a timestamp representing the packet transmission time on the streamer (the sending entity) and a packet counter field; the receiving side (e.g., the packet collector side, a re-assembly engine, or other recipient entity) sends ACK message back to the streamer with the related sent packet counter and timestamp for each packet that has indeed arrived to the recipient entity. The counter and timestamp are used (e.g., by the sending entity) in order to calculate the RTT for each packet, or the loss of packet(s) in case a related ACK message or packet was not received back at the sending entity. Those measures are used to calculate the average RTT and LOSS values over the defined time window. In this demonstrative example, the two sides are synchronized, and the timestamps may have sufficient granularity; and therefore, in some implementations, partial timestamp data may be utilized (e.g., truncating or cropping a portion of the time-stamp string, such as the current Date, or the current Hour, or even the current Minute; or keeping only the K right-most digits of the time-stamp, wherein K is for example 3 or 4 or 5 or 6 right-most digits) in order to save bandwidth (e.g., keeping in the timestamp only the milliseconds indicator, optionally with some indication of the second or other larger granularity timestamp but not necessarily all of that timestamp string in its entirety). In some embodiments, a Re-Formatting/Truncating Unit 127 of the transmitting device 101 may operate to re-format or truncate or encode or compress such data (e.g., time-stamp data, counter data), in order to reduce the bandwidth involved with the overhead of transmitting or exchanging such data or portions thereof.

In some embodiments, optionally, a window ACK indicator or message may be used (e.g., a single message indicating ACK for receiving several packets, acknowledge together). In some embodiments, optionally, NACK or Negative ACK messages may be used, for example, to indicate that a particular packet was not received (at all, or correctly). The sending entity may take into account such feedback information or feedback indicators, time-stamps, truncated or abbreviated time-stamps, ACK messages, multiple-packet ACK messages, NACK messages, multiple-packet NACK messages, or the like, in order to determine or estimate the above-mentioned parameters.

In a demonstrative example, eight modems (or transceivers, or transmitters) operate at the transmitting entity (e.g., a multiple-link bonding device, such as transmitting device 101) with the following exemplary pair values of {RTTi, LOSSi}:

Transmitting Modem 1: {RTT1=78 ms, LOSS1=0 pkts}
Transmitting Modem 2: {RTT2=95 ms, LOSS2=3 pkts}
Transmitting Modem 3: {RTT3=172 ms, LOSS3=20 pkts}
Transmitting Modem 4: {RTT4=81 ms, LOSS4=1 pkts}
Transmitting Modem 5: {RTT5=69 ms, LOSS5=0 pkts}
Transmitting Modem 6: {RTT6=340 ms, LOSS6=45 pkts}
Transmitting Modem 7: {RTT7=78 ms, LOSS7=0 pkts}
Transmitting Modem 8: {RTT8=132 ms, LOSS8=12 pkts}

For demonstrative purposes, two TCP-based flows are to be transmitted via that transmitting entity/bonding device, such as by transmitting device 101:

TCP flow A, with RWND of 65,500 Bytes
TCP flow B, with RWND of 4 Megabytes (MB)

In accordance with the present invention, the TCP-based Flow A can tolerate almost no packet re-ordering; the bonding selection process at the sending entity will strive to use a modem set (e.g., a combination of modems) having minimal RTT variance, or small-enough or sufficiently-small (under certain thresholds and stability) i.e. minimal delay variance in the receiving jitter buffer of the recipient entity; and the transmitting device may therefore select to use Modem Set {1, 2, 4, 5, 7} for transporting the small-size TCP-based Flow A. In contrast, the TCP-based Flow B is much more tolerable to packet re-ordering, and therefore the bonding selection process at the sending entity may select to use a modem set having relatively or absolutely big or bigger RTT variance, and therefore may select to use Modem Set {1, 2, 3, 4, 5, 7, 8} to transport the large-size TCP-based Flow B. It is noted that in this example, modem 6 considerably contributes to the RTT variance of the group of modems (e.g., the RTT6 value of 340 ms is much farther in statistical models than the average of the other modems or modem sets; and also, so does its packets loss, 45 lost packets in this example, again farther than the average of the other modems; such demonstrative correlation between RTT and LOSS deviations is possible but is not necessary), and therefore Modem 6 may not be used for transporting any of the two flows at that point in time.

In accordance with the present invention, a Modems Selector/Modems Grouping Unit 128 of the transmitting device 101 or other sending entity, may take into account, for the purpose of selecting which modem(s) to utilize and/or which modem(s) not to utilized and/or whether to distribute packets across multiple modems via multiple-links and/or whether to send packets only via a single modem, among other considerations, the RTT and/or LOSS parameters of one or more of the available modems, the average or mean or median or range or standard deviation or variance or other statistical function of the RTT and/or LOSS parameter(s), the absolute number of dropped or lost packets per modem (e.g., a transmission from Modem 5 has lost 47 packets in the past 5 seconds), the relative amount of lost of dropped packets per modem (e.g., a transmission from Modem 4 has lost 24 percent of packets in the past 7 seconds); or the difference between (i) an RTT value of a particular modem, and (ii) an average or other statistical function of RTT values of a group of other modems; or the difference between (I) a LOSS value of a particular modem, and (II) an average or other statistical function of LOSS values of a group of other modems); and/or other suitable combinations of these parameters, or of data that is calculated or determined by taking into account LOSS values and/or RTT values, per modem or per a group or subset of modems.

Figure 2:
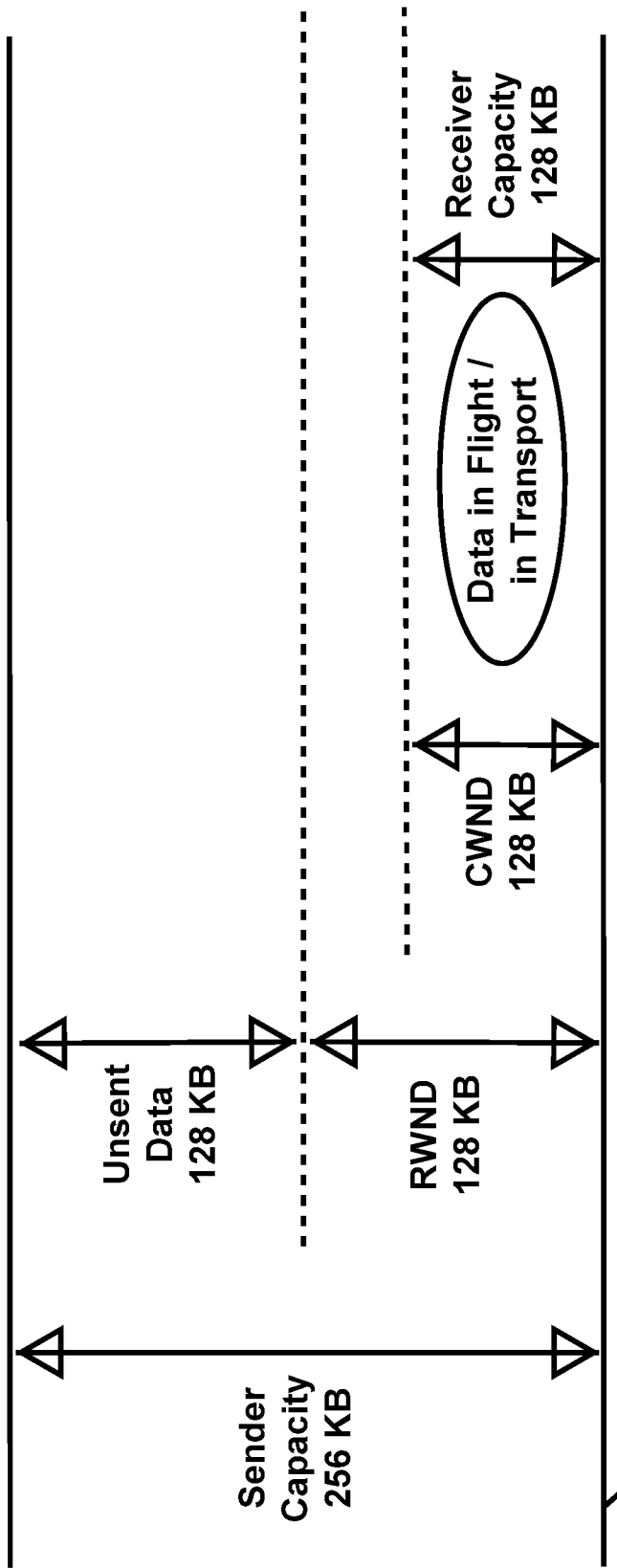
FIG. 2 is a schematic diagram of a diagram demonstrating an example of TCP parameters which may be utilized in accordance with some embodiments of the present invention.

In some embodiments, as TCP-based protocols are many times symmetric, the same or very similar receiver window (RWND) value or Congestion window (CWND) value or other such parameters may exist in the TCP-based protocol or header or in similar such protocols or stateful protocols; and then it may be sufficient to use these parameters known to one side without necessarily waiting for the other side to send them, or in combination with information that is already known (or already estimated) on this side, to expect the relevant link or connection goodput and accordingly to selectively direct relevant packets from relevant TCP or UDP flows to such selected modems or transceivers. In this context, reference is made to FIG. 2, which is a schematic diagram of a diagram 200 demonstrating an example of such TCP parameters which may be utilized in accordance with some embodiments of the present invention; and indicating or demonstrating, for example, the Sender Capacity (e.g., of transmitting device 101) which may be 256 KB or other suitable value; the Recipient Capacity (e.g., of remote recipient 102) which may be 128 KB or other suitable value; and further demonstrating values of the Receiver Window Size (RWND) as 128 KB, the Congestion Window Size (CWND) such as in there range of 50 to 80 KB, the unsent data size (e.g., 128 KB), and the data-in-flight between the Sender and the Receiver. Other suitable values or ranges-of-values may be used, with regard to these TCP parameters and/or other parameters.

For example, if the number of packets waiting to be transmitted from a specific first TCP or similar flow or connection (#A) is low, such as a small-sized web surfing or web-browsing request, whereas the number of packets awaiting or anticipated to be needed to be transmitted from another second TCP or similar or UDP flow (#B) is high volume or prolonged, for example when a YouTube or Netflix stream is viewed or when a live video is uploaded, then, the flow #A may be directed to a modem or link M1 with a low TCP receive window, whereas the flow #B may be transmitted over a bonded virtual link comprised of multiple communication links that are served by two or more other modems or connections or links, e.g. modems M2 and M3 and M4; whereas the single modem M1 has a momentary RTTi and/or LOSSi momentarily sufficiently different from each one of those of M2, M3 and M4, all of which are sufficiently momentarily similar or close enough (to each other) in their sizes. Later, when for example the RTTi and LOSSi of modem M1 becomes closer to that of M2 and M3, whereas at least one of the RTTi or LOSSi of modem M4 becomes momentarily different from those of modems M2 and M3, then the virtual bonded link may be modified to be comprised of modems M1 and M2 and M3, and to exclude modem M4. The flow #B may now be transmitted over this bonded virtual link comprised of modems M1 and M2 and M3, with its packets split or distributed for transport across these modems. Such splitting or distribution of packets to be transported may be done arbitrarily or randomly or pseudo-randomly or inequitably, or may be evenly distributed between these modems, or may be distributed across the modems in a cyclical round-robin manner, or in any other fair or unfair distribution scheme, and/or by taking into consideration other performance parameters known or predicted or measured, or configuration, or cost parameters of using each of these connections, or other considerations.

It is therefore possible to create and work with ad-hoc momentary, or more permanent combination, of single link and multi-link connections, that are utilized simultaneously. Some modems may participate in more than a single unilink and multi-link groups, depending on their momentary or more stable performance such as goodput, throughput, latency, error rate, jittery behavior, or other parameters, and/or based on the traffic to be delivered.

In some embodiments the selection of which modems or connections to use for each stream is aimed, or optimized, to create a homogenous performance within the set of connections at least in some of its parameters such as bandwidth, goodput, throughput, latency, error rate and/or jittery behavior. This homogenous versus heterogenous performance within the set may be analyzed using mathematical functions, such as mean square root, distance estimations or others. The homogenous level of each such set of bonded modems may vary according to the needs of the flow and/or the momentary performances of the participating links or modems or transceivers and/or of the other streams and/or other modems served by the same processor. This homogenous level may be defined with thresholds per service or flow type, per user, per condition, or may be learnt in real time. It may be adapted dynamically according to changes in said criteria.

For example, a unilink U1 consisting of (or served by) modem M1, may co-exist with, and may operate in parallel to, a bonded virtual link BVL1 which comprises modem M2+M3 and also another bonded virtual link BVL2 which comprises modems M3+M4; whereas a "mouse TCP flow" F1 is transmitted over the unlink U1, whereas a live compressed video uplink F2 which is an "elephant flow" is transmitted over BVL1, and whereas a downstream You-Tube flow F3 which is another "elephant flow" (prolonged, high volume, requires high goodput) is down-streamed over BVL3.

In another example, a short TCP burst or "mice flow" F1 is delivered using a modem M1 without checking its RTTi or LOSSi, and/or without consideration as to their variance and difference from those of the other modems that are available to be utilized by the system. A second TCP "mice flow" F2 is selectively directed to be served by a chosen transmitting modem M2, also without regarding its RTTi or LOSSi variance from those of the other modems. However, a third flow, which is a UDP uplink stream, is sent over a bonded virtual link consisting of modems M3 and M4 and split (or divided) between them according to the momentary performance of each (e.g., if modems M3 and M4 have current goodput of G3 and G4, respectively, then the packets of that third flow may be distributed to modems M3 and M4 at a ratio of approximately G3:G4).

In some embodiments, creating and working with a virtual broadband bonded link (VBL) may be done without necessarily wrapping or encapsulating the traffic in (or with) a bonding-specific or a new added protocol, and/or without de-capsulating it from this specific protocol at a proxy unit or at the destination. In some of these cases, the bonding receiver, or proxy unit, is therefore completely removed; and the TCP or similar traffic is delivered without additional encapsulation from the originating IP address to its destination IP address split over a multiplicity of modems or connections or links. For example, the originating transmitter or the transmitting device 101 evaluates the RTTi and LOSSi of the various flows that are to be transmitted and/or that are currently being transmitted, and analyzes the variance between or among them; sends each of them over another modem or connection or link; monitors their changing RTTi and LOSSi parameters when TCP or similar handshake ACKs are received as feedback back from the destination; selectively changes the transmission of the flows by selecting same or different modem(s) for each still-existing or new flow according to the newly received handshake or flow control or other network or transport level protocol indicators; creates and utilizes one or more virtually-bonded or aggregated broadband connections by aggregating capacity or bandwidth from multiple modems that have similar enough or sufficiently-similar (e.g., beyond a pre-defined threshold level of similarity) TCP RTTi or LOSSi or other such indicators; and sends relevant TCP-based or UDP-based flows wherein their packets are split or distributed over (or across) these modems in the bonded virtual connection. The selection of modems for each link (namely, uni-link connection, or bonded/aggregated multi-link connection), for each flow type or specific flow, for each direction (uplink or downlink), for each packet size or any other parameter, may change momentarily according to the changes in real time or predicted changes in any of these parameters or in the parameters of the connection or of the network or other parameters.

In some embodiments, optimization calculation or other suitable analysis may be performed with regard to (or, by taking into account) the variance in RTTi value and/or LOSSi value of the multiplicity of modems or transceivers or transmitters or connections that are associated with the system and/or that are generally available to the system and/or that are currently available for transmission at any point in time, or at pre-defined time intervals (e.g., once every 30 seconds, or once per K seconds), or at pre-defined triggering events or triggering conditions, or when the transmitting device is located in (or away from) a particular geographical point or location (e.g., relevant to mobile or moving transmitting device), or by taking into account time-of-day or day-of-week or other parameters; so that the right or suitable or optimal combination of modems according to this optimization process is selected for each such unilink or aggregated multilink, and/or is selected for the transport of the flows that are intended to be transmitted over them. Such optimization or selection process may be done, for example, in order to (or, with a goal to) minimize or reduce or decrease the variance between all connections within each single group, or by selecting (or assigning) modems to groups (or by otherwise grouping modems or transceivers into groups; wherein a group may comprise multiple modems, and/or a group may comprise a single modem) so that the variance of these parameters between the modems in the group is low enough (e.g., below a threshold value or percentage distribution); or to minimize or reduce the variance around a certain value or a particular value, such as for specific flow types or specific flows or applications or QoS considerations or goals; wherein threshold values may be pre-configured or hard-coded or pre-defined, or may be dynamically changed by the system from time to time per type of flow or other parameters of the flow or its packets (such as packet size), transmission requirements such as total bandwidth, available performance such as bandwidth or latency, or based on other criteria. The optimization algorithms may include, for example, mean square root, and/or any other suitable algorithms.

In other embodiments, the bonding management unit 122 or other suitable bonding processor or bonding controller unit, such as an Intentional Selective Latency Injector 129, may determine to selectively introduce an artificial momentary latency to some or all of the packets being delivered or transmitted in one of the aggregation connections group or one of the unilink modems. This may be done, for example, in order to artificially create a sufficient homogeneity between the modems or connections participating in that group or set, so that the RTT of the TCP-based or similar handshake protocols is made more stable and the overall aggregated bandwidth may be (A) more stable and (B) higher than without the artificially introduced latency. This latency may be introduced by actually adding delay or delay period(s) or waiting period(s), such as by delaying transmission in one or both directions, or by buffering or delaying packets prior to their presentation for outgoing transmission, or by buffering such outgoing packets internally within a circuit or component of the transmitting device (e.g., a buffer, a storage unit, a memory unit) prior to their release towards a transmitter or transceiver or modem; or by otherwise delaying (e.g., via a waiting or pausing operation) the allocation or distribution of some packets to one or more modems or transceivers; or by commanding one or more of the transceivers or modems or transmitter units to pause its operation for a pre-defined time period at a certain time-point or once a pre-defined condition holds true (e.g., upon completing the transmission of 8 or 14 or N packets). Alternatively or in parallel, it may be done "on paper" but not in reality, such as, by manipulating timing reports or clock/time stamps or other means, i.e. the real latency does not change or impacted or manipulated, but rather, only the reporting of it is modified or artificially changed or "faked". Usually such operations need not be the first choice made by the bonding processor or by the bonding management unit 122, which may typically prefer splitting the connections to different groups or allocating different types of flows to different groups of modems or transceivers. However, if the "elephant flow" demands much more bandwidth than available, by aggregating sufficiently homogenously performing modems, then such decision may be made. The artificially added latency may be done in one direction or the other or both and at low enough levels to keep the TCP-based protocols from dropping too much. This step may also be taken as a measure to try and compensate for RTT increase, or increase in the latency in any of the directions, which is expected to be either erroneous or sufficiently unimportant for the overall transmission or very momentary so, and that such artificial change may compensate for that without impact on the performance, or if such impact is expected to be either insignificant or better than having the RTT increase and the aggregated bandwidth drop with all the impact as earlier described here.

In some embodiments, the right or most-efficient or more-efficient or optimized or more-suitable matching of flows with modems (or transmitters, or transceivers, or communication links) in unilink (single link of default choice, current availability, first or last in line of links, or any other evaluated or even a random or pseudo-random selection of a single modem) or as a bonded multilink of aggregated connections or as a virtual bonded link (VBL), or directing of flows packets to specific modems or to groups of packets or to bonded virtual links (multilink) or to a packet distribution unit, or selecting the modems for each momentary or permanent flow transport, may be done by the bonding management unit 122 and/or by a Flow-to-Modem(s) Matching Unit 130; for example, during an initial transmission and/or during other suitable portion or part of the transport process. For example, it may optionally utilize (or may be based on) deep packet inspection (DPI) which analyzes traffic to determine which Type of traffic it is (e.g., an HD video file which is typically an "elephant flow", or conversely, a JPG or PNG or GIF image which is typically a "mouse flow) or which analyzes traffic to determined which Application (or "app") or which Type of Application is associated with it (e.g., detecting that Flow 1 is associated with a video chat application such as Skype and is thus an "elephant flow"; or, detecting that Flow 2 is associated with a Text Messaging application and is thus a "mouse flow" or "mice flow"), or by analyzing or looking at the destination of an HTTP request or by analyzing the origin and/or destination of a packet or a request (e.g., a set of packets incoming from, or outgoing to, a YouTube server, or incoming from a Netflix video streaming server, may indicate being part of an "elephant flow"), or via another means. In some embodiments, a Traffic Analysis and Classification Unit 131 may be responsible for analysis and classification of data or packets or flows, based on the criteria described above and/or based on other criteria; and such classification of the traffic type, and/or of the type or properties of the traffic and/or its destination and/or its origin, and/or the type or identity or properties of the Application or "app" or program that is associated with that flow, may then be utilized to classify a Flow as an "elephant flow" or as "mice flow", and/or to allocate or match between a particular flow and a particular modem/transceiver, or to match between a particular flow and a particular set or group of multiple modems/transceivers or with a particular Virtual Bonded Link (VBL) that is comprised of such particular aggregation of certain modems/transceivers. The transmitting device 101 may assume or determine or estimate that a certain flow is either a mice flow or an elephant flow, and it may direct the packets of that flow from the beginning (or, from the point of determination and onward) over or via the matching or suitable modem unilink or modems multilink.

It is noted that the Traffic Analysis and Classification Unit 131 may be internal to transmitting device 101, or may be integrated therein, or may be coupled to it; or may even be, in some implementations, external and/or remote to transmitting device and may externally or remotely perform such traffic monitoring and analysis and classification and may send back to transmitting device 101 the classification results. In some embodiments, one or more of the operations mentioned above or below, may optionally be implemented via a High-Volume/Long-Lived Flow Detector 133, which may operate to classify or characterize the volume and/or life-span of flows, and/or which may operate to classify a flow as either (i) a High-Volume and/or Long-Lived flow, or (ii) a flow that is not high-volume and is not long-lived In some embodiments, the right matching or assignment of flows with modems in unilink or bonded in multilink, or directing flows packets to specific modems or to bonded virtual links (multilink), or selecting the modems for each momentary or permanent flow, may be done continuously or periodically, or at pre-defined time intervals (e.g., every 3 or 5 or 10 or 20 or T seconds), or when needed during the transmission. In some embodiments, this is done only for flows which are long enough, i.e., only with regard to data-flows that are identified to be "elephant flows"; for example, with regard to live video transmission, long uploads or downloads of files, or the like.

In some embodiments, "unknown" (or, non-characterized) flows or traffic, may include flows which the system does not have information or cannot yet estimate or determine as to whether they are long lived or high volume, or on the contrary—short lived or low volume or low rate or periodic rather than continuous; and such unknown flows or non-characterized flows may be delivered over a unlink (single point-to-point connection) as a default transport route. The delivery system may use a logical tunnel over that unilink, such as may be created in Link Aggregation Group (LAG) forwarding, or port forwarding, or another form or type of logical tunnel, or a unicast over this single link or other; and this may be implemented by a Logical Tunnel Over Unilink control module 132. Once additional packets for the same flow arrive from the originating application or source, the system may count them, or may count them per time units, or may count time, or may otherwise assess or determine or estimate whether they construct a flow which is either (i) long-lived and/or high volume or continuous, or (ii) short-lived or small volume or otherwise, in order to determine whether it would be more efficient to be sent over a virtual bonded link or a single unilink.

In some embodiments, a processor or a flow analyzer or traffic analyzer or a flow monitoring module or traffic monitoring module of the transmitting device, such as the Traffic Analysis and Classification Unit 131 (which may be implemented as a Traffic Monitoring and Analysis and Classification Unit) may continue to monitor the flow or traffic until its immediate demise, for example within about 500 milliseconds (or, within K milliseconds, as relevant to the networks and technologies at hand), or until it becomes identified as a flow of high volume or of continuity, or until it is identified as both long lived and high volume, or continuously for any relevant duration of the connection or delivery, or until a pre-defined condition is met (e.g., continue to monitor the flow as long as there are two modems available for transporting data; or, continue to monitor the flow as long as the transmitting unit is moving or travelling or is in motion or does not maintain a fixed geographic location).

In some embodiments, optionally, the default delivery or transport of a new stream or data-flow from the originating entity to the recipient, is not necessarily done over a single unlink as a default route, but rather, over any other type of connection(s) which may be pre-defined as the default transport route, and such default transport route may (in some implementation) be a Virtual Bonded Link (VBL) or a particular set or subset of aggregation of modems/transceivers. Then, a flow that is established or beginning or is ready for initiating transport, may be delivered over multi-link, either bonded together into a virtual multi-link connection or not, as a default transport route. It will then be evaluated during the transport, or during the initial T seconds or during the initial T milliseconds of such transport, to check how it behaves and how it is characterized or classified and how the link(s) performance changed accordingly, or in order to characterize the data-flow itself and/or the current (or predicted, or estimated) performance of the available modems, transceivers and/or links. This may be done, for example, when there is pre-knowledge about that data flow, such as, regarding its volume or size (e.g., in bytes, or in minutes of playback for an audio or video file) or longevity, or based on deduced knowledge, or when the system or device defined the default transport route to be a multilink route for other reasons.

In some embodiments, the values defining "high volume", "continuous", "long-lived", "low volume", "short-lived", "large sized", "small sized", "non-continuous", or other descriptors of a data flow, may be pre-configured or hard-coded or pre-defined, or may be changed adaptively and/or dynamically during the operation of the system (and in some embodiments, even during or within an already-ongoing transport of a data-flow), according to performance characteristics changes and dynamicity or the performance of the involved links or modems or transmitters, or based on machine-learnt insights (e.g., supervised or unsupervised) by monitoring the decisions and the results in the delivery bandwidth and/or goodput and/or throughput and/or latency (e.g., using single or multiple parameters learning).

In some embodiments, the right or suitable or efficient matching of flows with modems/transceivers in unilink or bonded in multilink, or directing flows packets to specific modems or to bonded virtual links (multilink), or selecting the modems for each momentary or permanent flow, may be done continuously or periodically or when needed during the transmission, or at certain time intervals (e.g., every T seconds), or if one or more conditions hold true (e.g., if N packets or N bytes have been transmitted already from that flow).

In some embodiments, the decision or the determination by the system, (i) to use unilink for transporting specific types of flows such as "mice flows", or (ii) to use bonded virtual links for other flow types such as "elephant flows", may be reversed or may be selected in the opposite kind of matching. This may depend on the learning of the system, on specific networks, operators or links, on different transport protocols or variations of, or other parameters. In some implementations, due to specific network features or constraints, "elephant flows" may be assigned to a single unilink, whereas "mice flows" may be assigned to a bonded/aggregated multi-link connection. In some embodiments, for example, an owner of an operator of the transmitting device 101, may be charged based on the number of different links or modems or transceivers that it utilizes; and this may be taken into account, in addition or instead of other criteria; and may lead, for example, to a decision to transport an "elephant flow" using a single unilink. Similarly, in some embodiments, the transmitting device 101 or the system 100 may determine, or may receive an indication, that a particular "elephant flow" is being transported as a low-priority/non-urgent transport, such as, a large text file being uploaded to a Dropbox repository for storage there; and may thus select to allocate a single unilink to such "elephant flow", rather than a VBL. In another example, the transmitting device 101 or the system 100 may determine, or may receive an indication, that a particular flow includes a series of numerous JPG files are required to be transported urgently to a particular recipient or type of recipient (e.g., a live broadcasting news recipient; a law enforcement recipient), and may thus select to transport this "mice flow" over a VBL utilizing multiple modems/transceivers, rather than using a single unilink.

In some embodiments, the decision-making process may be based on two, or three, or multiple conditions or criteria or rules, and not only on the characterization of a data-flow as being an "elephant flow" or a "mice flow". In a demonstrative example, an implementation may utilize the following set of rules or conditions: (1) start to transport the data-flow using a single uni-link; (2) if the data-flow is then characterized as an "elephant flow", for example when the incoming rate of packets to-be-transported is bigger than X1 bps for a continuous window period of for example T1 milliseconds, then switch to send the remaining packets via a bonded multi-link; (3) if the data-flow is characterized as a "mice flow", but T or more seconds have elapsed (or, N or more bytes were already transported), then continue to send the remaining packets via the uni-link; (4) if it is determined that the transmitting device is moving at a speed of more than L meters per minute, then force to switch the transport to a bonded multi-link (e.g., for any type of flow; or, only for a flow identified as an "elephant flow"); (5) if the estimated cost associated with utilizing a bonded multi-link, is not more than a monetary amount of D dollars, and the flow is identified as an "elephant flow", then utilize a single unilink; and so forth, with other suitable conditions or criteria.

In some embodiments, the system may define and/or utilize more than two major types of TCP-based flows or similar flows. For example, the system may define or use several grades or levels or steps of "intensity" of the transport protocol, or a spectrum of such values, or a non-continues series or set of discrete values. Each such level may be directed to the same or different unilink or virtual bonded multilink. The virtual bonded multilink may consist of different number of modems or connections, of different aggregated performance such as goodput or throughput or latencies, of different allowed variance levels in the RTTi and/or LOSSi of the associated modems, in absolute or relative numbers or values. For example, a demonstrative implementation may defined three types of TCP-based data flows: (I) a first type which is an "elephant flow", defined as a data-flow that requires to transport at least 50 megabytes of data to a single recipient whereas any of the available links, according to their momentary performance or the known typical or max performance, is capable of delivering more than 10 megabytes or sometimes even 55 or even 70 megabytes (i.e., either in absolute values or in correlation or respective of the ratio between the needed performance and the actual performance); (II) a second type which may be referred to as an "intermediate-size flow" or a "sheep flow", defined as a data-flow that requires to transport between 1 to 50 megabytes of data to a single recipient; (III) a third type which may be referred to as "mice flow", for a data-flow having a total size of 1 megabyte or less. The system may define suitable transport routes for each such type of data-flow; for example, defining that the first type is to be transported via a bonded multi-link of four modems; that the second type is to be transported via a bonded multi-link of two modems; and that the third type is to be transported via a single uni-link. Other suitable definitions may be used.

In some embodiments, UDP-based packets may be sent or transported or may be allocate or assigned to modems/transceivers or to communication links, according to the same logic or process which TCP-based packets are sent in accordance with the present invention. For example, if a UDP-based flow is identified by the system to be either long-lived or high volume, it may be transmitted over a virtual bonded multi-link connection or VBL connection. If it is not yet identified or characterized, it may start to be transmitted over a single unilink. If it is identified to have similar transmission requirements as a known TCP flow, such as a current or past TCP flow, for example it is measured or otherwise identified to have a similar rate or packet sized or goodput or latencies or other parameters which are sufficiently similar to any TCP flow previously or currently handled in the system, it may then be transmitted using similar link(s) that were utilized to transport such other data-flows.

In some embodiments, TCP packets may be generated by the system rather than by a higher layer application, such as if no such TCP or similar application currently generates them and no such flow exists, and the packets are transmitted over one or more of the available or associated links or modems or transmitters. These may then be used as probes to the route or routes performances; and the results, with regard to the RTT or RTTi or LOSSi or other indicators or descriptors, may then be used to select the right modem or modems combination(s) for unilink or virtual broadband multilink for other protocol flows, such as for UDP flow(s). These TCP parameters may change dynamically during the transmission of the other flows according to the load that these other flows place or put on the transport route, so that these TCP probes may be used as adequate or sufficient indicators for changing the transport manner of the UDP-based flows, redirecting them or some of their packets to other modems or modem combinations, or the like. In this way, TCP dummy packets or probing packets may be used to discard of the proxy or receiver of bonded protocols otherwise necessary (in some systems) for UDP-based flows in order to return measurements information that is not returned as UDP has no feedback mechanism. In some embodiments, performance data collected or obtained with regard to transport of TCP-based flow(s), may be utilized by the system in order to deduce from it the estimated characteristics of UDP-based transport(s).

In some embodiments, learning from the performance and indicators of some TCP-based transmission may be used to deduce or estimate or predict the modems selection or packets direction of unilink or multilink combinations to use with some data flows. For example, extrapolating from the performance of a TCP flow consisting of a certain bandwidth or rate using modem M1, may indicate that on the same modem all lower bandwidth flows of any protocol may be transmitted (e.g., one by one), or multiple flows where the combined bandwidth is similar to this single bandwidth may be transmitted via this single modem M1, or that over another modem of the same operator potentially at least half of that bandwidth may be used, or any other conclusion, extrapolation, or calculation that is based on such available data.

In some embodiments, 3GPP 5G New Radio (NR) is used in conjunction, or aggregated with, 4G LTE by the user equipment (UE) device such as by the transmitting device 101. Various TCP-based or similar mechanisms, such as those that require handshaking, may be used on top of the two Radio Access Technology (RAT) interfaces when trying to use both together simultaneously to generate bandwidth aggregation. Typically, the two RATs are operated by the same network operator (yet, this is not necessary in some embodiments of the present invention, where the two or more connections or modems or transceivers may be operated by two (or more) different core or access networks and infrastructures and different network operators or network providers). This may be referred to as "Dual Connectivity" (or as one type of such). Some embodiments of the present invention may regard (and may utilize) the two RATs as two connections on which RTT or uplink latency or downlink latency are measured. If their momentary latencies differ absolutely or respectively by too much or excessively or beyond a pre-defined threshold of difference, this might hinder TCP-based or similar handshake transport of IP packets, and thus the bonding processor or the bonding management unit 122 may decide to treat them as candidates for its homogeneity optimization algorithms as described above. When, for example, there is also a Wi-Fi modem participating and available for use by this transmitting device 101, it may decide that the Wi-Fi is more homogenous with the 4G LTE and therefore deliver an "elephant stream" S1 on the 5G NR, and deliver an "elephant stream" S2, and/or multiple "mice streams" S3 through Sn over a bonded link comprised of the 4G LTE modem and the Wi-Fi.

In some embodiments, the more permanent known links can be taken into account in advance, such as some satellite links, LANs, fiber, fiber optic links, cable modems, DSL, ADSL, xDSL, or other; and such other types of links or connections may be utilized, for example, as the selected uni-link, or as part of a selected bonded multiple-link connection; or optionally in combination with wireless links, Wi-Fi links, cellular links, or the like.

In some embodiments the multi-link bonding may include multi Radio Access Technologies (multi-RAT), 5G New Radio (NR) and LTE, 3GPP Dual Connectivity (cellular and Wi-Fi or cellular 5G NR and cellular 4G), 3GPP LAA and LWA (Licensed and unlicensed spectrum), Converged networks (cellular and Wi-Fi such as connected via cables or xDSL or fiber or satellite), cellular and satellite, satellite and fixed, satellite and satellite, cellular and cellular, Wi-Fi and Wi-Fi, cellular and DSRC V2X, or any other combination of networks, technologies, spectrum portions, operators and/or modems delivering IP packets.

The Applicants are aware that some conventional devices, such as some smartphones having a YouTube application, may allow a human user to choose in advance a manual setting, indicating whether Any video that is uploaded from that smartphone to the YouTube server, (i) would be uploaded Only if there is an active Wi-Fi Internet connection, or (ii) can be uploaded at any time by utilizing any available Internet connection such as Cellular connection. However, such manual setting is of course narrowly tailored and limited, to one particular "app" and to one particular selection, and is performed by a human at the Application Level. In contrast, the system of the present invention may dynamically select a combination of modems or transceivers, or only a single transceiver/modem/connection, out of several which are available for uploading a data flow; without relying on a previous and manual human-defined rule or setting, and without relying on a particular App or Application; and performing such selection and allocation of flow(s) to modem(s)/transceiver(s) at the Transport Level or at the Device Level or through a hardware component or through a lower Layer relative to the Application Layer.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. An apparatus comprising:
   a link bonding management unit, to determine with regard to a data-flow that is intended for transmission to a single remote recipient, whether (A) to transmit said data-flow via a single communication link over a single transmitter of said apparatus, or (B) to transmit said data-flow via two or more communication links serviced by two or more, respective, transmitters of said apparatus;
   a data-flow classification unit, to classify said data-flow as either a short-lived data-flow or a long-lived data flow, and to further classify said data-flow as either a small-volume data-flow or a large-volume data-flow;
   wherein the link bonding management unit is to select (A) if said data-flow is classified as a short-lived data-flow or as a small-volume data-flow;
   wherein the link bonding management unit is to select (B) if said data-flow is classified as a long-lived data-flow or as a large-volume data-flow.

2. The apparatus of claim 1,
   wherein the link bonding management unit is to select, upon selecting to transmit said data-flow via two or more communication links serviced by two or more transmitters, which particular multiplicity of transmitter to utilize for said transmission of said data-flow to said single remote recipient, out of three-or-more available transmitters of said apparatus.

3. The apparatus of claim 1,
   wherein the data-flow classification unit is to classify said data-flow as a default classification of short-lived data-flow; and to re-classify said data-flow as a long-lived data flow if the data-flow classification unit detects one or more indicators of a long-lived data-flow;
   wherein the link bonding management is to perform an initial selection of either (A) or (B) based on said default classification of said data-flow, and to modify said selection based on re-classification of said data-flow by the data-flow classification unit.

4. The apparatus of claim 1,
   wherein the data-flow classification unit is to classify said data-flow as a default classification of long-lived data-flow; and to re-classify said data-flow as a short-lived data flow if the data-flow classification unit detects one or more indicators of a short-lived data-flow;
   wherein the link bonding management is to perform an initial selection of either (A) or (B) based on said default classification of said data-flow, and to modify said selection based on re-classification of said data-flow by the data-flow classification unit.

5. The apparatus of claim 1,
   wherein the data-flow classification unit is to classify said data-flow as a default classification of large-size data-flow; and to re-classify said data-flow as a small-size data flow if the data-flow classification unit detects one or more indicators of a small-size data-flow;
   wherein the link bonding management is to perform an initial selection of either (A) or (B) based on said default classification of said data-flow, and to modify said selection based on re-classification of said data-flow by the data-flow classification unit.

6. The apparatus of claim 1,
   wherein the data-flow classification unit is to classify said data-flow as a default classification of small-size data-flow; and to re-classify said data-flow as a large-size data flow if the data-flow classification unit detects one or more indicators of a large-size data-flow;
   wherein the link bonding management is to perform an initial selection of either (A) or (B) based on said default classification of said data-flow, and to modify said selection based on re-classification of said data-flow by the data-flow classification unit.

7. The apparatus of claim 1,
   wherein said data-flow classification unit is to classify said data-flow as either a short-lived data-flow or a long-lived data flow by taking into account at least: the identity of a remote recipient to which said data-flow is intended for transmission; wherein the identity of said remote recipient is defined by at least one of: an Internet Protocol (IP) address of said remote recipient, a Domain Name System (DNS) host name of said remote recipient, a domain name that is associated with said remote recipient, a Universal Resource Locator (URL) that points to said remote recipient, an IPv4 address of said remote recipient, an IPv6 of said remote recipient.

8. The apparatus of claim 7,
wherein said identity is obtained from a dynamically-updated list that associated among remote recipients and their respective identity identifiers.

9. The apparatus of claim 1,
wherein said data-flow classification unit is to classify said data-flow as either a short-lived data-flow or a long-lived data flow by taking into account at least: the type of data that is carried in said data-flow.

10. The apparatus of claim 1,
wherein said data-flow classification unit is to classify said data-flow as either a short-lived data-flow or a long-lived data flow by taking into account at least: the type of data that is carried in said data-flow as obtained from Deep Packet Inspection (DPI) analysis of said data-flow.

11. The apparatus of claim 1,
wherein said data-flow classification unit is to classify said data-flow as either a short-lived data-flow or a long-lived data flow by taking into account at least: identification of the type of application that generated said data-flow intended for transmission.

12. The apparatus of claim 1,
wherein the link bonding management unit is to select either (A) or (B) by taking into account at least: a size of a Receiver Window (RWND) that is advertised by said single remote recipient in a TCP or TCP-based protocol header obtained from said single remote recipient.

13. The apparatus of claim 1,
wherein the link bonding management unit is to select either (A) or (B) by taking into account at least: a size of a Congestion Window (CWND) that is extracted from a TCP or TCP-based protocol header of a packet of said data-flow being transported towards said single remote recipient.

14. The apparatus of claim 1, comprising:
a Round-Trip Time (RTT) determination unit,
(a) to determine a first RTT value of a first transmitter that participates in a Virtual Bonded Link (VBL) transmission of said data-flow to said single remote recipient,
(b) to determine a second RTT value of a second transmitter that participates in said VBL transmission of said data-flow to said single remote recipient,
(c) to perform an analysis that is based at least on the first RTT value and the second RTT value, and to determine that the first RTT value is excessive;
wherein based on said analysis the link bonding management unit is to remove, at least temporarily, said first transmitter from participating in said VBL that transmits said data-flow to said single remote recipient;
wherein said first transmitter, which is removed from participating in said VBL, is utilized instead for transporting another data-flow which is a small-size data-flow.

15. The apparatus of claim 1, comprising:
a Packet-Loss Occurrence Characteristic (PLOC) determination unit,
(a) to determine a first PLOC value of a first transmitter that participates in a Virtual Bonded Link (VBL) transmission of said data-flow to said single remote recipient, indicating an amount or a frequency of packet loss of said first transmitter,
(b) to determine a second PLOC value of a second transmitter that participates in a Virtual Bonded Link (VBL) transmission of said data-flow to said single remote recipient, indicating an amount or a frequency of packet loss of said second transmitter,
(c) to perform an analysis that is based at least on the first PLOC value and the second PLOC value, and to determine that the first Packet-Loss Occurrence value is excessive;
wherein based on said analysis the link bonding management unit is to remove, at least temporarily, said first transmitter from participating in said VBL that transmits said data-flow to said single remote recipient;
wherein said first transmitter, which is removed from participating in said VBL, is utilized instead for transporting another data-flow which is a small-size data-flow.

16. The apparatus of claim 1,
wherein the link bonding management unit is
(a) to allocate at least one first small-size data-flow, to be transported over a single particular transmitter of said apparatus;
(b) to allocate at least one large-size data-flow, to be transported over a particular Virtual Bonded Link (VBL) formed of two or more particular transmitters of said apparatus via inequitable allocation of packets for transport across said two or more particular transmitters;
(c) to monitor the performance of the transmission of the first small size data-flow over said single particular transmitter;
(d) to monitor the performance of the transmission of the one large-size data-flow over said particular VBL formed of two or more particular transmitters;
(e) to allocate at least one second small-size data-flow, to one of the used transmitters or to another transmitter of the apparatus, based on monitored performance of said transmitters and based on a level of Quality of Service (QoS) that is required by the second small-size data-flow.

17. The apparatus of claim 1, comprising:
an Intentional Selective Latency Injector, to perform selective injection of artificial momentary latency to at least some of the packets of said data-flow prior to their transmission via a particular transmitter of the apparatus,
wherein said selective injection of artificial momentary latency causes sufficient transmission homogeneity among two or more transmitters of said apparatus that participate in outgoing transmission of said data-flow.

18. The apparatus of claim 1, comprising:
an Intentional Selective Latency Injector 129, to perform selective injection of artificial momentary latency to at least some of the packets of said data-flow prior to their transmission via a particular transmitter of the apparatus,
wherein said selective injection of artificial momentary latency causes sufficient transmission homogeneity among Round-Trip Time (RTT) values that are associated with two or more transmitters of said apparatus that participate in outgoing transmission of said data-flow.

19. The apparatus of claim 1,
wherein the apparatus comprises or is connected to a camera, which generates a video stream carried by said data-flow and intended for transmission.

20. The apparatus of claim 1,
wherein the apparatus is implemented as one of: a smartphone, a tablet, a laptop computer, a desktop computer, a video camera, a vehicle, a vehicular entertainment system, a self-driving vehicle, a remotely-controlled vehicle, an Unmanned Aerial Vehicle (UAV), a drone.

\* \* \* \* \*